US009253075B2

(12) United States Patent
Jacobson et al.

(10) Patent No.: US 9,253,075 B2
(45) Date of Patent: Feb. 2, 2016

(54) DYNAMIC ROUTING PROTOCOLS USING DATABASE SYNCHRONIZATION

(71) Applicant: Palo Alto Research Center Incorporated, Palo Alto, CA (US)

(72) Inventors: Van L. Jacobson, Woodside, CA (US); Marc E. Mosko, Santa Cruz, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 302 days.

(21) Appl. No.: 13/720,736

(22) Filed: Dec. 19, 2012

(65) Prior Publication Data

US 2014/0173137 A1    Jun. 19, 2014

(51) Int. Cl.
*H04L 12/755* (2013.01)

(52) U.S. Cl.
CPC ................... *H04L 45/021* (2013.01)

(58) Field of Classification Search
CPC ............... G06F 17/30312; G06F 17/30321; G06F 17/3033; G06F 17/30345; G06F 17/30575–17/30584; H04L 29/0854; H04L 45/021
See application file for complete search history.

(56) References Cited

U.S. PATENT DOCUMENTS

| 2007/0112880 A1* | 5/2007 | Yang et al. ................. 707/201 |
| 2007/0127457 A1* | 6/2007 | Mirtorabi et al. ............ 370/389 |
| 2007/0189284 A1* | 8/2007 | Kecskemeti .................. 370/389 |
| 2008/0243992 A1* | 10/2008 | Jardetzky et al. ............ 709/203 |
| 2011/0231578 A1* | 9/2011 | Nagappan et al. ............ 709/248 |
| 2012/0179653 A1* | 7/2012 | Araki et al. .................. 707/634 |
| 2014/0040505 A1* | 2/2014 | Barton et al. ................ 709/248 |

OTHER PUBLICATIONS

Jacobson et al., "Custodian-Based Information Sharing," Jul. 2012, IEEE Communications Magazine: vol. 50 Issue 7 (p. 38-43).*

* cited by examiner

*Primary Examiner* — Brian J Gillis
*Assistant Examiner* — Gil H. Lee
(74) *Attorney, Agent, or Firm* — Shun Yao; Park, Vaughan, Fleming & Dowler LLP

(57) ABSTRACT

A network-connectivity system can receive a remote additive hash for a routing-data collection of a remote network node, and compares the remote additive hash with a local additive hash for a local routing-data collection. A respective additive hash represents one or more network-configuration items of a routing-data collection. Also, at least one of the network-configuration items of the routing-data collection includes reachability information for a network node of a computer network, such as a link-state advertisement. If the system determines that the remote additive hash does not match the local additive hash, the system synchronizes the local routing-data collection with the remote network node of the computer network.

21 Claims, 11 Drawing Sheets

DYNAMIC ROUTING PROTOCOLS USING DATABASE SYNCHRONIZATION

RELATED APPLICATION

The subject matter of this application is related to the subject matter of the following applications:

U.S. patent application Ser. No. 12/970,740, entitled "CUSTODIAN-BASED ROUTING IN CONTENT-CENTRIC NETWORKS," by inventors Van L. Jacobson and Marc E. Mosko, filed 16 Dec. 2010;

U.S. patent application Ser. No. 12/970,819, entitled "SIP-BASED CUSTODIAN ROUTING IN CONTENT-CENTRIC NETWORKS," by inventors Marc E. Mosko and Simon Barber, filed 16 Dec. 2010; and U.S. patent application Ser. No. 13/681,306, entitled "DATA TRANSPORT BY NAMED CONTENT SYNCHRONIZATION," by inventors Van L. Jacobson and Marc E. Mosko, filed 19 Nov. 2012;

the disclosures of which are incorporated by reference in their entirety herein.

BACKGROUND

1. Field

This disclosure is generally related to computer networks. More specifically, this disclosure is related to propagating routing information across network nodes of a computer network using database synchronization operations.

2. Related Art

Link-based routing protocols, such as Intermediate System to Intermediate System (IS-IS) and Open Shortest Path First (OSPF), propagate link state information across a network by sending link-state advertisements (LSAs) to neighboring network nodes. When a network node receives an LSA, the network node can create an updated graph for the map of the network, and updates a routing table to indicate a first node along a shortest path to each network node.

In link-based routing protocols, it is important that all nodes of a computer network operate under the same network map to prevent forwarding packets in a routing loop within the network. To maintain a synchronized network map, network nodes propagate a received LSA to other neighboring nodes of the computer network, which allows other neighboring nodes to update their routing table.

Oftentimes, an LSA is propagated to a network node that has previously received and propagated the same LSA. Unfortunately, to avoid propagating the LSA in a forwarding loop, a typical network node has to store state information that indicates which neighboring nodes have received which LSAs from the network node. Further, when the network node receives an LSA, the network node has to search through this state information to determine which nodes have not received the LSA, and avoids sending the LSA to all other neighboring nodes. Thus, network nodes experience an undesirable storage cost and computation cost to synchronize link state information across the network.

SUMMARY

One embodiment provides a system that can receive a remote additive hash for a routing-data collection of a remote network node, and compares a local additive hash, for a local routing-data collection of the local network node, with the remote additive hash. A respective additive hash represents one or more network-configuration items of a routing-data collection. Also, at least one of the network-configuration items of the routing-data collection includes reachability information for a network node of a computer network. The system can synchronize the local routing-data collection with the remote network node of the computer network in response to determining that the remote additive hash does not match the local additive hash.

In some embodiments, the system can receive a filter from the remote network node, such that the filter indicates selection criteria for selecting network-configuration items that are desired by the remote network node. The system then determines, from the local routing-data collection, a set of network-configuration items that satisfy the filter's selection criteria, and generates the additive hash using the network-configuration items that satisfy the filter's selection criteria.

In some embodiments, while synchronizing the routing-data collection, the system generates a filtered collection of network-configuration items. This filtered collection can include one or more network-configuration items, from the network-configuration items that satisfy the filter's selection criteria, that are missing from the remote routing-data collection. The system then sends the network-configuration items of the filtered collection to the remote device.

In some embodiments, the routing-data collection can include historical hashes that each represents a previous snapshot of the routing-data collection.

In some embodiments, while synchronizing the routing-data collection, the system compares the remote additive hash to one or more historical hashes to determine a matching historical hash. The system then determines, based on the matching historical hash, one or more network-configuration items to send to the second remote device.

In some embodiments, while synchronizing the routing-data collection, the system compares the remote additive hash to one or more historical additive hashes for the local routing-data collection. Then, in response to determining that the remote additive hash does not match a historical hash of the local routing-data collection, the system identifies one or more network-configuration items from the routing-data collection of the remote network node that are missing from the local routing-data collection. The system then obtains the missing one or more network-configuration items from one or more network nodes, and adds the missing one or more network-configuration items to the local routing-data collection.

In some embodiments, the system can generate a network-configuration item that corresponds to a change in a network configuration of the computer network, and adds the network-configuration item to the local routing-data collection. The system also generates a new additive hash for the routing-data collection. Further, in response to adding the network-configuration item to the local routing-data collection, the system can synchronize the local routing-data collection with the remote network node of the computer network.

In some embodiments, the network-configuration item includes a link-state advertisement (LSA) that reflects a change in state for a link of the computer network, and the system updates a forwarding table for the computer network to account for a link's updated state as determined from the network-configuration item obtained during collection synchronization.

In some embodiments, while generating the new additive hash, the system determines a hash for a previous LSA for the link, and subtracts the determined hash from the local additive hash for the local routing-data collection. The system also computes a hash for the obtained LSA, and adds the computed hash to the local additive hash.

In some embodiments, the network-configuration item includes an entry for a Prefix-to-Custodian table (PC table), and the system can update the PC table for the computer network to account for the network-configuration item obtained during collection synchronization.

In some embodiments, the network-configuration item includes an entry for a Custodian-to-Endpoint table (CE table), and the system can update the CE table for the computer network to account for the network-configuration item obtained during collection synchronization.

BRIEF DESCRIPTION OF THE FIGURES

In the figures, like reference numerals refer to the same figure elements.

DETAILED DESCRIPTION

Figure 1:
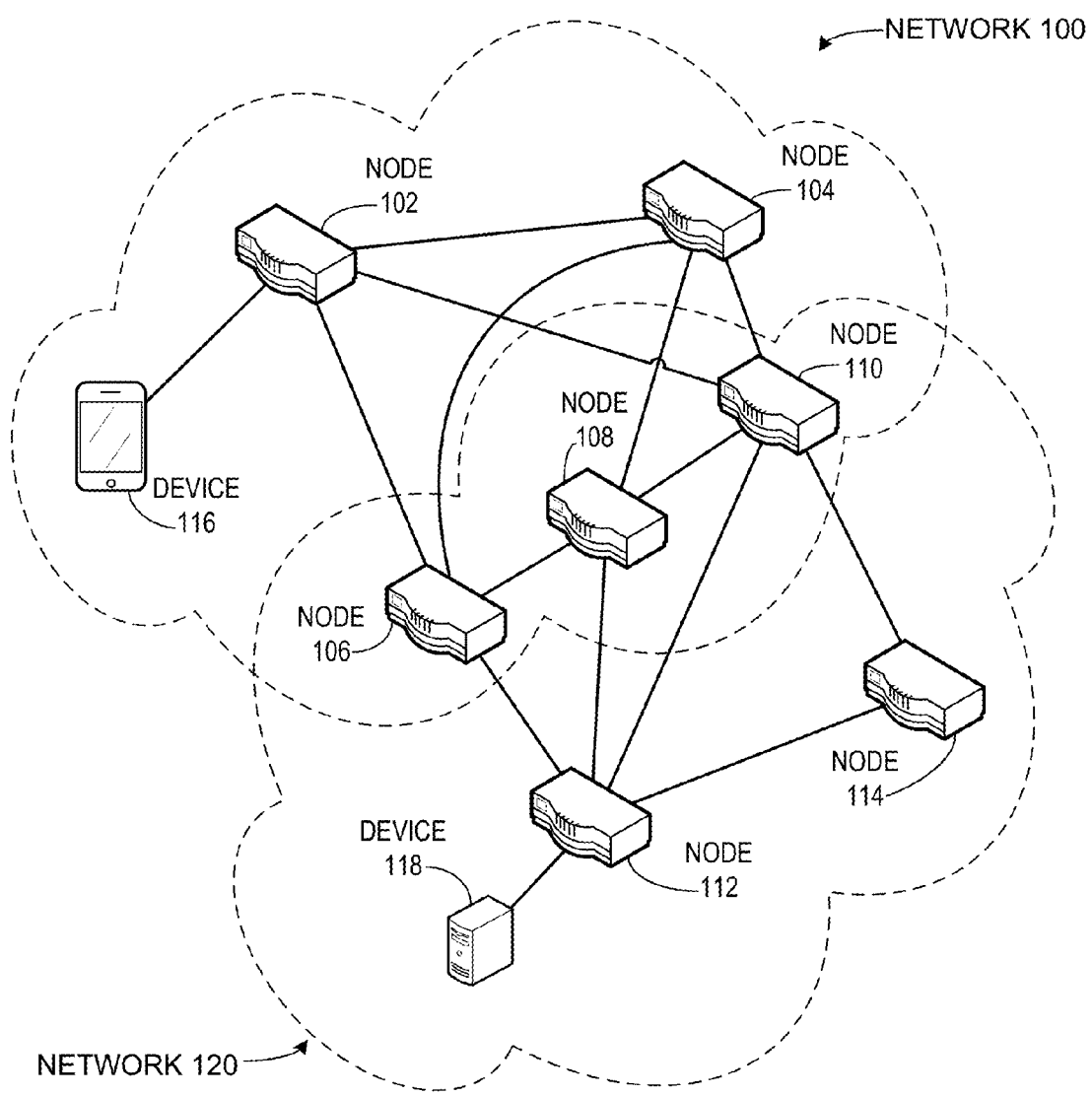
FIG. 1 illustrates exemplary computer networks in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that implements a dynamic routing protocol, which performs database synchronization to automatically synchronize routing data and network configuration information with other network nodes. For example, the system can use a routing-data collection to store a plurality of network-configuration items for a computer network. The network-configuration item can include a link-state advertisement (LSA) (e.g., for an Open-Shortest-Path-First (OSPF) protocol), or can include an entry for a Prefix-to-Custodian table (PC table) or for a Custodian-to-Endpoints table (CE table) (e.g., for a Custodian-based routing protocol).

The system can obtain updates to this network-configuration data by synchronizing the local routing-data collection with other network nodes. Also, the system can use this information to configure the local network node to connect with other nodes in the network, for example, by updating a forwarding table for the computer network.

In a content-centric network (CCN), a data collection can include content items that belong to a certain namespace, and a namespace can correspond to one or more structured names. Further, each structured name is unique, location-independent, and persistent with respect to a certain content item. The namespace includes at least part of a content name which can be used to match content items with a more specific name that falls logically within the scope of the namespace. The system can subscribe to a namespace for each network to which it belongs, and can synchronize a routing-data collection for a namespace with other network nodes that are also subscribed to the same namespace.

For example, a border router that is connected to multiple areas of a computer network can subscribe to namespaces for those areas (e.g., "Area 1" and "Area 2"). Other routers that are not border routers may only subscribe to a single area. This way, a router that subscribes to the namespace "Area 1" only obtains network-configuration items for Area 1, and a router that subscribes to the namespace "Area 2" only obtains network-configuration items for Area 2. The border router that subscribes to both namespaces can obtain network-configuration items for Area 1 and Area 2.

Because a network-configuration item's structured name is unique and persistent, the system can generate a hash value for each network-configuration item based on the structured name, without having to process the data for each content item. The system can also generate an additive hash for each routing-data collection, based on the hashes for the individual network-configuration items of a routing-data collection, so that the additive hash represents the contents of the routing-data collection. For example, the system can generate the additive hash by using an addition operation (or some other mathematical function) to process the hashes for the individual network-configuration items of the routing-data collection.

To synchronize routing-data collections with a remote network node, the local node can provide to the remote node at least a recent additive hash for each collection that they have in common. The local node can receive additive hashes from the remote device as well. If the local device detects a difference in an additive hash for a routing-data collection, the local and remote devices can engage in a collection-synchronization operation to resolve the discrepancy in their routing-data collections.

In some embodiments, the local node can determine whether a remote node's routing-data collection is an older version of the local node's collection by determining whether the collection of network-configuration items at the remote node are a subset of the collection of network-configuration items at the local node. However, performing a cross-comparison between the structured names for the network-configuration items at the local and remote nodes can be a computationally expensive task. To avoid having to perform this expensive cross-comparison operation, the local node can store historical hashes (e.g., additive hashes that have become outdated) for the local routing-data collection. Then, the local node can determine whether the remote node's routing-data collection is an older version (e.g., a subset of the local routing-data collection) by determining whether the additive hash from the remote node matches a historical hash for the local routing-data collection.

In some embodiments, a network node can use a filter to indicate a subset of network-configuration items that are to be synchronized. To use the filter, the local and remote nodes agree upon a set of filters that are to be used to select network-configuration items. The local and remote nodes then exchange additive hashes that represent the network-configuration items of their local collection that satisfy the filter's selection criteria. The local and remote devices use these additive hashes to determine whether their collections are synchronized, and/or to determine which network-configuration items need to be exchanged.

The collection-synchronization protocol is inherently a multi-party protocol that does not require the various network nodes to have synchronized clocks, and does not require a network node to store persistent state information for other nodes. When two network nodes have synchronized collections, the system can use a synchronization operation to detect the synchronized state with an O(1) runtime per collection. The communications cost of the synchronization operation also has an O(1) runtime, because the system only needs to transfer one additive hash per collection. When collections are out-of-sync, the system can synchronize the local and remote collections with an O(log n) runtime, where n is the number of content items in the collection.

Synchronizing Reachability Information for Virtual Private Communities

In some embodiments, the local network node can belong to a device community, known as a Service Enhanced Network (SEN) Virtual Private Community (VPC), that organizes a user's computing devices into a social graph. For example, a user can own several devices, and can organize these devices into various groups of the VPC. This allows the user's various devices to securely communicate data across the VPC to provide services to the user. The system can implement a VPC Connectivity Agent (VCA) that can efficiently synchronize connectivity information across nodes of a device community to form a social graph.

A VPC can have several domain levels: User (VPC domain level "1"); Home (VPC domain level "2"); and Group (VPC domain level "3"). For example, a device belongs to one User, who may have several devices. A User belongs to one Home, which may include several Users. Users and Homes may belong to zero or more Groups. The associations between devices and VPC domains (e.g., devices and users and homes and groups) are authenticated using cryptographic methods to provide secure relationships for the VPC.

The VCA allows devices to connect to other associated devices by propagating reachability information between VPC domains. Each device can use this reachability information to determine how to reach a target domain. This reachability information can include, for example, an updated link state for a link of a computer network. The VCA can use this reachability information to maintain synchronized forwarding tables across devices of the VPC. The VCA uses an up-to-date forwarding table to create CCN connections between pairs of ccnd routers, and can register appropriate prefixes on those connections. For example, the VCA can operate like an on-demand routing protocol that brings up dialer interfaces or switched virtual circuits on a conventional router, and monitors these connections to remove connections that have been idle for a determinable time duration.

Synchronizing Link States for a Link-State Routing Protocol

In a link-state routing protocol, such as Open Shortest Path First (OSPF), each node in a network generates a graph that maps the connectivity between nodes in the network. Thus, each node in the network uses its knowledge about the link states for the nodes in the network to calculate a best logical path to the other nodes in the network. In some embodiments, the system can store LSAs in the route-data collection to facilitate synchronizing link state information with other network nodes without having to store per-node persistent state information. For example, typical synchronization techniques (e.g., OSPF) require a network node to store long-lived state information per network neighbor to determine which LSAs are known by which neighbors. The network node then uses this long-lived state information to determine which LSAs have been forwarded to which neighboring nodes, and thus avoid sending duplicate LSAs to its neighboring nodes (e.g., to avoid LSA forwarding loops). In contrast, the system provided by embodiments of the present invention can determine whether a neighboring node's link state information is synchronized with the local node by determining whether the additive hashes for their route-data collections match. Further, if their additive hashes do not match, the system can determine which LSAs (which are stored in the route-data collection using network-configuration items) to send to the remote device based on a historical additive hash, or by performing set reconciliation to determine a set difference between hashes for network-configuration items at the local node and the neighboring node.

Synchronizing PC and CE Tables for a Custodian-Based Routing Protocol

In a Custodian-based information sharing (CBIS) protocol, "custodians" are entities that have an explicit relationship with a collection of data. The custodian name identifies an entity that may have a desired piece of information. Also, each custodian publishes an Endpoint Table that lists all the communication endpoints from which it can be reached. For example, the communication endpoints can include reachability information such as a globally routable IP address, a MAC address, a domain-name server (DNS) name, etc.

In the CBIS protocol, network nodes use and synchronize network-configuration items that include entries from Prefix-to-Custodian (PC) tables and Custodian-to-Endpoint (CE) tables. During operation, a network node can use updates to the PC table and the CE table (e.g., which the network node can obtain by synchronizing its routing-data collection with other nodes) to update a CCN forwarding information base (FIB). The FIB maps a prefix (e.g., a CCN prefix) to an endpoint (e.g., reachability information for a custodian associated with the CCN prefix).

The entries in the PC table (e.g., prefix-to-custodian bindings) are independent of each other. Thus, in some embodiments, each custodian publishes a network-configuration item for each PC table entry corresponding to a prefix for which the custodian is responsible. Further, the entries in a CE table (e.g., the custodian's endpoints) are typically not independent of each other. Thus, in some embodiments, each custodian publishes its CE table as a single network-configuration item.

FIG. 1 illustrates exemplary computer networks 100 and 120 in accordance with an embodiment. Network 100 can include a plurality of network nodes (e.g., routers) 102, 104, 106, 108, and 110 that form a network area (e.g., "Area 1"). Each of these network nodes can store a local copy of a routing-data collection that includes configuration information for network 100, such as link state information. A network node can synchronize the routing-data collection with other nodes of the computer network by using the content-centric network to synchronize content items that belong to the namespace "Area 1." These nodes can use network-configuration information of their local collection to maintain a forwarding table for the computer network.

For example, when a computing device 116 (e.g., a user's mobile phone, laptop, or any other personal computing device) connects to network node 102, network 102 can detect reachability information to device 116 and updates its local routing-data collection to reflect the reachability information. Then, to propagate the reachability information, node 102 can synchronize its routing-data collection for network 100 with other nodes of network 100. Network node 102 does not have to send a network-configuration item directly to other nodes of network 100, and does not have to keep track of which network-configuration items have been communicated to which neighboring nodes. After synchronizing their routing-data collection for network 100, network nodes 102-110 can use the reachability information of their local routing-data collection to update their local forwarding table to determine a shortest path for routing data to device 116.

Similarly, network 120 can include a plurality of network nodes (e.g., routers) 106, 108, 110, 112, and 114 that form a network area (e.g., "Area 2"). Each of these network nodes also store a local copy of a routing-data collection that includes configuration information for network 120. Notice that network nodes 106, 108, and 110 are border routers that belong to both network 100 and network 120. Thus, network nodes 106, 108, and 110 can include a collection for namespace "Area 1" and a separate collection for namespace "Area 2." The other network nodes of network 100 (e.g., network nodes 112 and 114) belong only to network 120, and can only synchronize the collection for namespace "Area 2" with the border routers (nodes 106, 108, and 110).

For example, when a computing device 118 (e.g., a user's mobile phone, laptop, or any other personal computing device) connects to network node 112, network 112 can detect reachability information to device 118 and updates its local routing-data collection to reflect the reachability information. Then, node 112 can synchronize its routing-data collection for network 100 with other nodes of network 100 to propagate the updated reachability information. Thus, network node 112 can interact with network node 106 to synchronize the routing-data collection for the namespace "Area 2," but does not obtain content items for the namespace "Area 1" from network node 106. After synchronizing their routing-data collection for network 120, network nodes 106-114 can use the reachability information of their local routing-data collection to update their local forwarding table to determine a shortest path for routing data to device 118.

Figure 2:
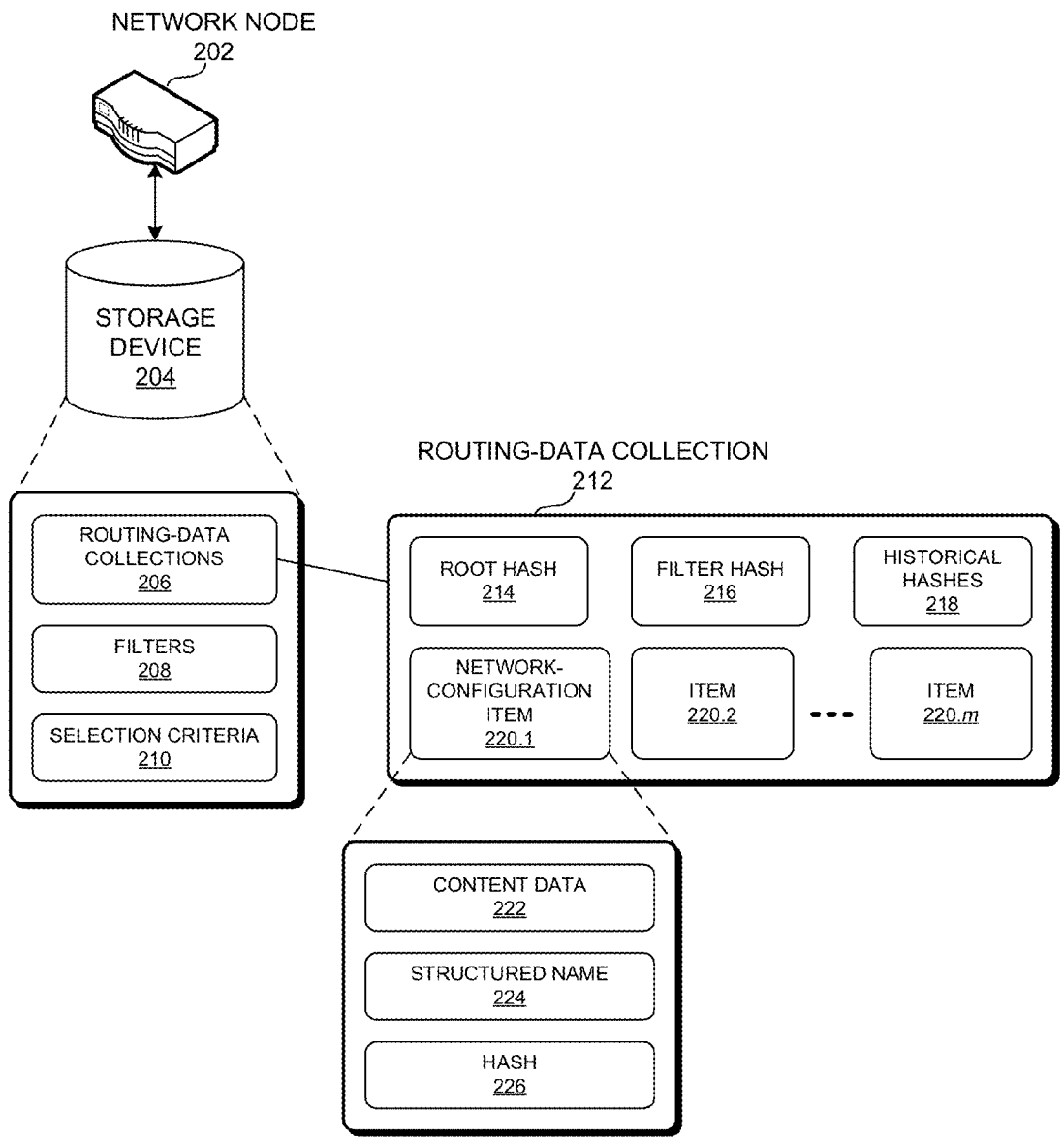
FIG. 2 illustrates an exemplary network node that stores a routing-data collection in accordance with an embodiment.

FIG. 2 illustrates an exemplary network node 202 that stores a routing-data collection in accordance with an embodiment. Network node 202 can include a storage device 204 that stores at least a plurality of routing-data collections 206, and can store filters 208. Storage device 204 can include a hard drive, a solid state device, and/or any other non-volatile storage medium now known or later developed.

A filter can indicate selection criteria for selecting one or more network-configuration items that are to be accounted for in a collection summary for a remote user. In some embodiments, storage device 204 can include a predetermined set of selection criteria 210 for use by each filter. Table 1 presents a plurality of exemplary selection criteria in accordance with an embodiment.

TABLE 1

| Selection Criteria | Description |
| --- | --- |
| 1. Namespace | A namespace that identifies a routing-data collection, such as a namespace for a computer network. |
| 2. Subdomain | A named identifier that identifies a subset of content from the routing-data collection. The subdomain can correspond to a portion of a computer network, such as a VPC domain level "1" ("User" subdomain), a VPC domain level "2" ("Home" subdomain), or a VPC domain level "3" ("Group" subdomain). |
| 3. Network-configuration item type | A type of content that is to be synchronized. |

Network node 202 can receive filters 208 from various other devices that have synchronized their routing-data collections with node 202 in the past. By storing filters 208, node 202 can use filters 208 over time to generate a record of how hashes for routing-data collections 206 have changed over time (e.g., historical hashes 218 for routing-data collection 212). Network node 202 can compare these historical hashes to hashes of a remote routing-data collection to determine whether the remote routing-data collection matches an older version of the local routing-data collection. If so, the system can determine that the remote routing-data collection is a subset of the local routing-data collection.

Routing-data collections 206 can include one or more routing-data collections to which the local user has subscribed. A routing-data collection 212, for example, can include network-configuration items 220, and can include nested routing-data collections of network-configuration items. Further, routing-data collection 212 can also include a plurality of additive hashes that represent network-configuration items 220. For example, routing-data collection 212 can include a root hash 214, filter hashes 216, and historical hashes 218. In some embodiments, a nested collection can also include other network-configuration items and nested collections, and can include additive hashes for the nested network-configuration items (e.g., a root hash, filter hashes, historical hashes).

A network-configuration item (e.g., network-configuration item 220.m) can include content data 222, a structured name 224 for content data 222, and a hash 226 for content data 222. Recall that structured name 224 is unique and persistent to the current version of content data 222. In some embodiments, node 202 generates hash 226 by processing structured name 224 using a one-way hash function, which is significantly faster than generating a hash from content data 222.

Network node 202 can generate additive hashes for routing-data collection 212 when node 202 synchronizes the local routing-data collection with a remote routing-data collection, or when node 202 receives a new filter from a remote device. Further, network node 202 can assign a timestamp to each root hash and filter (e.g., for routing-data collection 212). In some embodiments, network node 202 can use these timestamps to distinguish between current hashes and historical hashes. In some other embodiments, prior to generating a new root hash or a filter hash, node 202 may migrate the existing root hash and filter hashes into a data store for historical hashes. For example, the system can store these hashes within a database table for historical hashes, or within a nested collection or directory that it reserves for historical hashes.

To generate root hash 214 (e.g., the current additive hash for collection 212), node 202 can combine the hashes from network-configuration items 220 and the root hashes for any nested collections (not shown). For example, node 202 can combine these hashes by performing an addition operation on these hashes, or by performing some other mathematical function. Further, node 202 can generate a filter hash for each of filters 208 by first recursively generating a filter hash for each of nested collections. Then, node 202 can combine these filter hashes for the nested collections with hashes for network-configuration items 220 that satisfy the filter's selection criteria (e.g., using an addition operation, or using some other mathematical function).

Synchronizing a Routing-Data Collection

Figure 3:
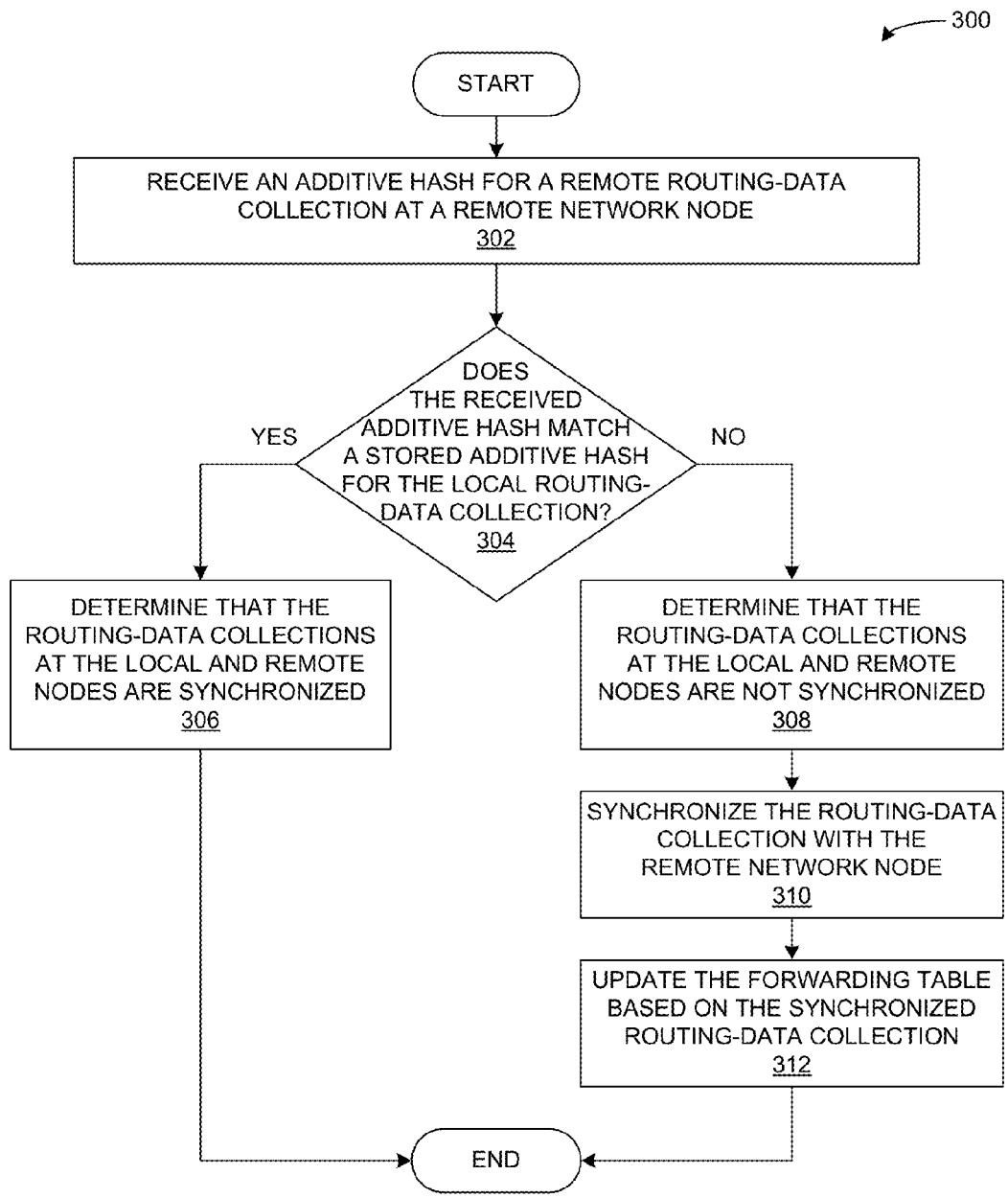
FIG. 3 presents a flow chart illustrating a method for synchronizing a routing-data collection and a forwarding table with a remote network node in response to receiving an additive hash for the collection from the remote node in accordance with an embodiment.

FIG. 3 presents a flow chart illustrating a method 300 for synchronizing a routing-data collection and a forwarding table with a remote network node in response to receiving an additive hash for the collection from the remote node in accordance with an embodiment. During operation, the system can receive an additive hash for a remote routing-data collection at a remote network node (operation 302). The system then determines whether the received additive hash matches a stored additive hash for the local routing-data collection (operation 304).

In some embodiments, if the received additive hash matches the stored additive hash, the system determines that the routing-data collections at the local and remote devices are synchronized (operation 306). Recall that an additive hash represents a plurality of network-configuration items of a network node's routing-data collection, and that the network-configuration items are used to generate a connection with remote nodes of the computer network. Thus, two network nodes that have synchronized routing-data collections may also have synchronized forwarding tables.

However, if the received additive hash does not match the stored additive hash, the system determines that the routing-data collections at the local and remote devices are not synchronized (operation 308). The system then synchronizes the routing-data collection with the remote network node (operation 310), and updates the forwarding table based on the network-configuration items of the synchronized routing-data collection (operation 312). For example, to update the forwarding table, the system can use the network-configuration items to create an updated graph for the map of the computer network. The system then uses this graph to determine a shortest path to each network node (e.g., using Dijkstra's algorithm, or a variation thereof), and to update the forwarding table to indicate a first node along a shortest path to each network node.

Whenever the network node finishes synchronizing the routing-data collection with the remote node, the local node generates and stores an up-to-date additive hash for the routing-data collection. The system stores this additive hash so that it is associated with a timestamp for the collection-synchronizing operation, and associated with the network-configuration items that the hash represents. Over time, the system builds a history of additive hashes for the routing-data collection, which allows the system to quickly determine whether a remote routing-data collection matches a previous version of the local routing-data collection, and which network-configuration items are associated with this previous version. The local node can limit the amount of storage that is allocated for historical hashes, given that the usefulness of a historical hash diminishes with time as the other devices synchronize their routing-data collection to the current version.

In some embodiments, when the system determines that the current version of the remote and local routing-data collections do not match, the system can simplify the synchronization operation by determining whether the remote routing-data collection matches a prior version of the local routing-data collection. If so, the system can conclude that the remote routing-data collection is a subset of the local routing-data collection, and can synchronize network-configuration items with the remote device without having to perform an expensive item-by-item comparison operation with the remote routing-data collection.

Figure 4:
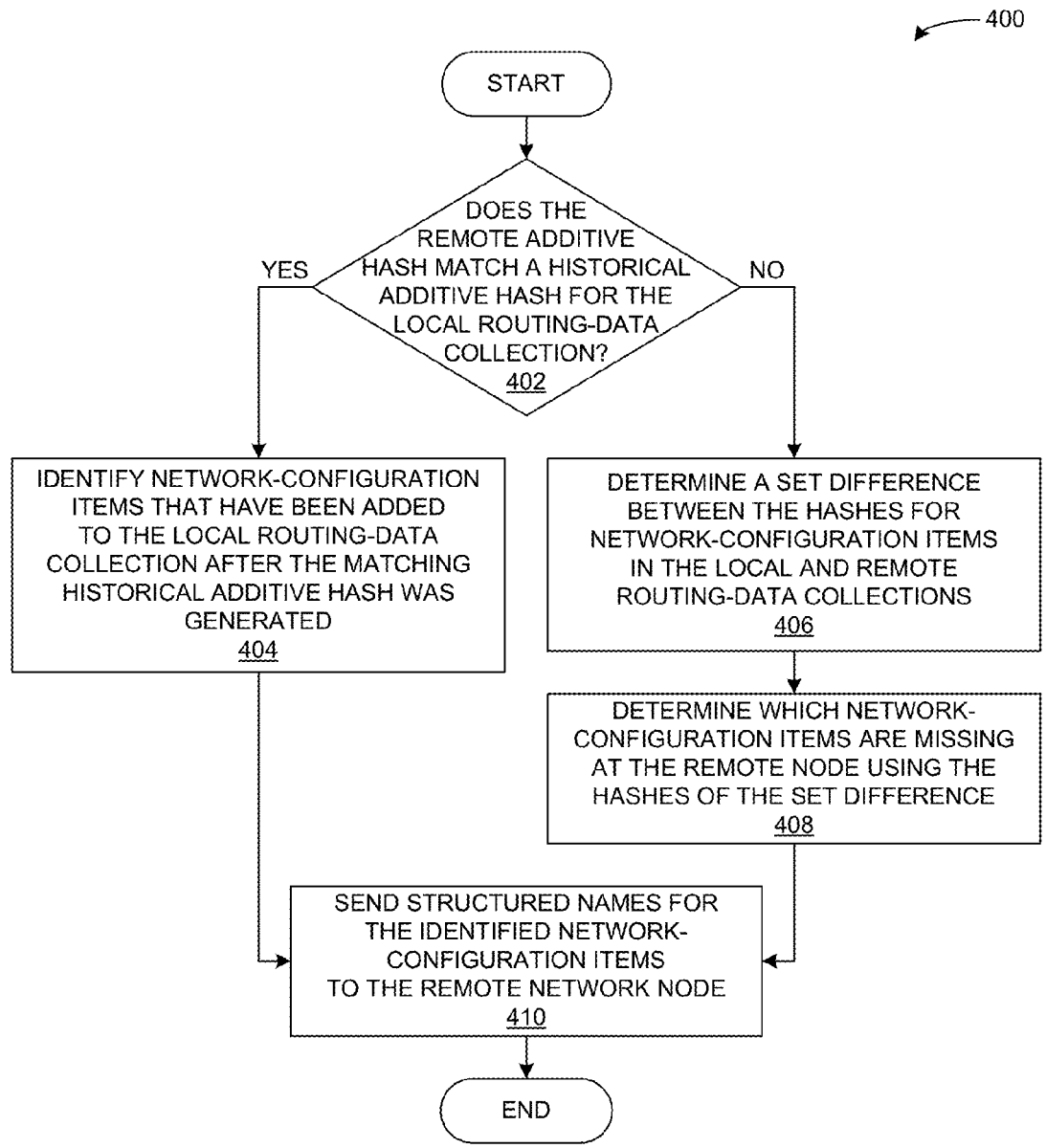
FIG. 4 presents a flow chart illustrating a method for sending structured names for network-configuration items to a remote network node in accordance with an embodiment.

FIG. 4 presents a flow chart illustrating a method 400 for sending structured names for network-configuration items to a remote network node in accordance with an embodiment. During operation, the system determines whether the remote additive hash matches a historical additive hash for the local routing-data collection (e.g., determines whether the remote routing-data collection is a subset of the local routing-data collection) (operation 402). If so, the system identifies network-configuration items that have been added to the local routing-data collection after the matching historical additive hash was generated (operation 404). The system then sends structured names for these network-configuration items to the remote network node, which allows the remote network node to synchronize the remote routing-data collection with the local routing-data collection (operation 410).

In some embodiments, the remote hash does not match a local historical hash when the remote routing-data collection is not a strict subset of the local routing-data collection. In some other embodiments, these hashes may not match when the local device has expunged (or did not store) a historical hash that matches the remote hash. In either case, the system determines a set difference between the hashes for network-configuration items in the local and remote routing-data collections (operation 406), and determines which network-configuration items are missing at the remote device from the hashes of the set difference (operation 408). The system then proceeds to operation 410 to send structured names for these network-configuration items to the remote device.

For example, the system can perform operation 406 by comparing individual hashes for network-configuration items between the local and remote devices to detect disparities. The system can obtain the remote device's individual hashes during operation 302 (e.g., when receiving the additive hash for the remote routing-data collection), or it can obtain these individual hashes by requesting them from the remote device at a later time.

It can be inefficient to compare hashes for individual network-configuration items when a routing-data collection is large. For example, it would be inefficient for the local and remote devices to exchange individual hashes for a routing-data collection with thousands of network-configuration items when the set difference includes only a few additional network-configuration items. In some embodiments, the system can perform set reconciliation (e.g., during operation 406) using a technique similar to Eppstein et al. (Eppstein, et al., "What's the Difference? Efficient Set Reconciliation without Prior Context," Proceedings of SIGCOMM11), which is hereby incorporated by reference.

To perform operation 406, the system can obtain a digest for the routing-data collection of the remote device, and the system can also generate and send a digest for the local routing-data collection to the remote device. The system can generate the digest by generating an invertible bloom filter (IBF) vector for the local routing-data collection. For example, unlike other reconciliation techniques, the system can map each individual network-configuration item to k cells of the IBF table by using k hash functions ($H_k$) to process an identifier for the network-configuration item that is derived from the network-configuration item's structured name (e.g., using the existing hash for the network-configuration item as the identifier, as opposed to using an identifier derived from the network-configuration item's data). The system also uses a hash function that corresponds to a respective cell ($H_c$) to generate a hash from an aggregation of the identifiers for the network-configuration items that map to that cell.

Each cell of the IBF table stores a sum of the hash identifiers (idSum) for the network-configuration items that map to the cell, a sum of the hashes (hashSum), and a number of network-configuration items that are mapped to the cell (count). For example, to add an network-configuration item i (with an existing hashes $s_i$ for the routing-data collection) to an IBF cell B[j], the system updates the IBF entry by computing the following:

$$B[j].\text{idSum} = B[j].\text{idSum} \oplus s_i \quad (1)$$

$$B[j].\text{hashSum} = B[j].\text{hashSum} \oplus H_c(s_i) \quad (2)$$

$$B[j].\text{count} = B[j].\text{count} + 1 \quad (3)$$

The system then uses the digest for the local routing-data collection ($D_A$) and the digest of the remote routing-data collection ($D_B$) to determine identifiers for the network-configuration items that make up the set difference between the local and remote routing-data collections. For example, to compute the difference, $D_{A-B} = D_A - D_B$, the system performs the following computations for each cell i of the IBF tables for the local and remote routing-data collections (IBFs $B_1$ and $B_2$, respectively):

$$B_3[i].\text{idSum} = B_1[j].\text{idSum} \oplus B_2[j].\text{idSum} \quad (4)$$

$$B_3[i].\text{hashSum} = B_2[i].\text{hashSum} \oplus B_2[i].\text{hashSum} \quad (5)$$

$$B_3[i].\text{count} = B_1[i].\text{count} - B_2[i].\text{count} \quad (6)$$

Thus, the IBF $B_3$ represents the digest difference $D_{A-B} = D_A - D_B$, and/or the system can generate an IBF $B_4$ that represents the digest difference $D_{B-A} = D_B - D_A$.

Then, the system can scan through IBF $B_3$ or $B_4$ to recover identifiers (hashes) for the network-configuration items that make up the set difference. The system first detects "pure" cells from the IBF table whose idSum value matches an identifier for an network-configuration item s in the set difference, and the system updates the IBF table to remove the network-configuration item s from all the IBF cells that it maps to. Then, the system iteratively detects other pure cells, and updates the IBF table to remove entries for other network-configuration items that make up the set difference, until either the IBF table is empty or no more pure cells exist. The system can then use the identifiers for the network-configuration items in the set difference (e.g., the hashes to these network-configuration items) to determine the network-configuration items that need to be synchronized.

Updating a Local Routing-Data Collection

Figure 5:
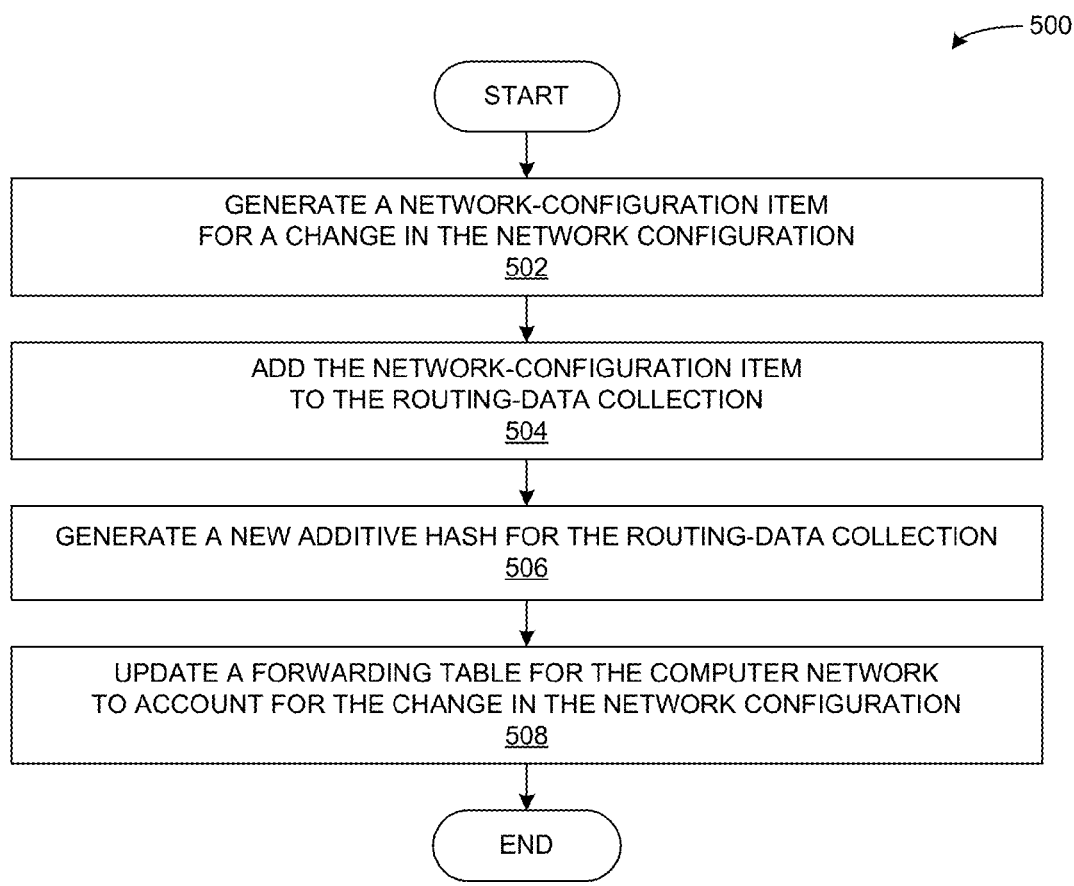
FIG. 5 presents a flow chart illustrating a method for updating a network node's routing-data collection in accordance with an embodiment.

FIG. 5 presents a flow chart illustrating a method 500 for updating a network node's routing-data collection in accordance with an embodiment. During operation, the system can generate a network-configuration item for a change in the network configuration (operation 502), and adds the network-configuration item to the routing-data collection (operation 504). After updating the routing-data collection, the system generates a new additive hash for the routing-data collection (operation 506).

In a link-state routing protocol, such as Open Shortest Path First (OSPF), the network-configuration item can indicate an LSA for a network link whose link state has changed. The network-configuration item can include an LSA that identifies the local network node as the origin node for the LSA, and identifies link states for the links to the local node's neighboring nodes. The LSA can also include a sequence number for the LSA, such that a higher sequence number is assigned to a newer LSA from the local network node. In a Custodian-based routing protocol, the network-configuration item can indicate changes to the PC table and/or the CE table.

In some embodiments, the system can update a forwarding table for the computer network to account for a change to the network configuration (operation 508). For example, in a link-state routing protocol, the system can use the network-configuration items in the collection to create an updated graph for the map of the computer network. The system uses this graph to determine a shortest path to each network node, and to update the forwarding table to indicate a first node along a shortest path to each network node. In a CBIS protocol, the system can use updates to the PC table and/or the CE table to update the FIB (e.g., a ccnd forwarding table), which can provide an endpoint list for one or more prefixes.

Figure 6:
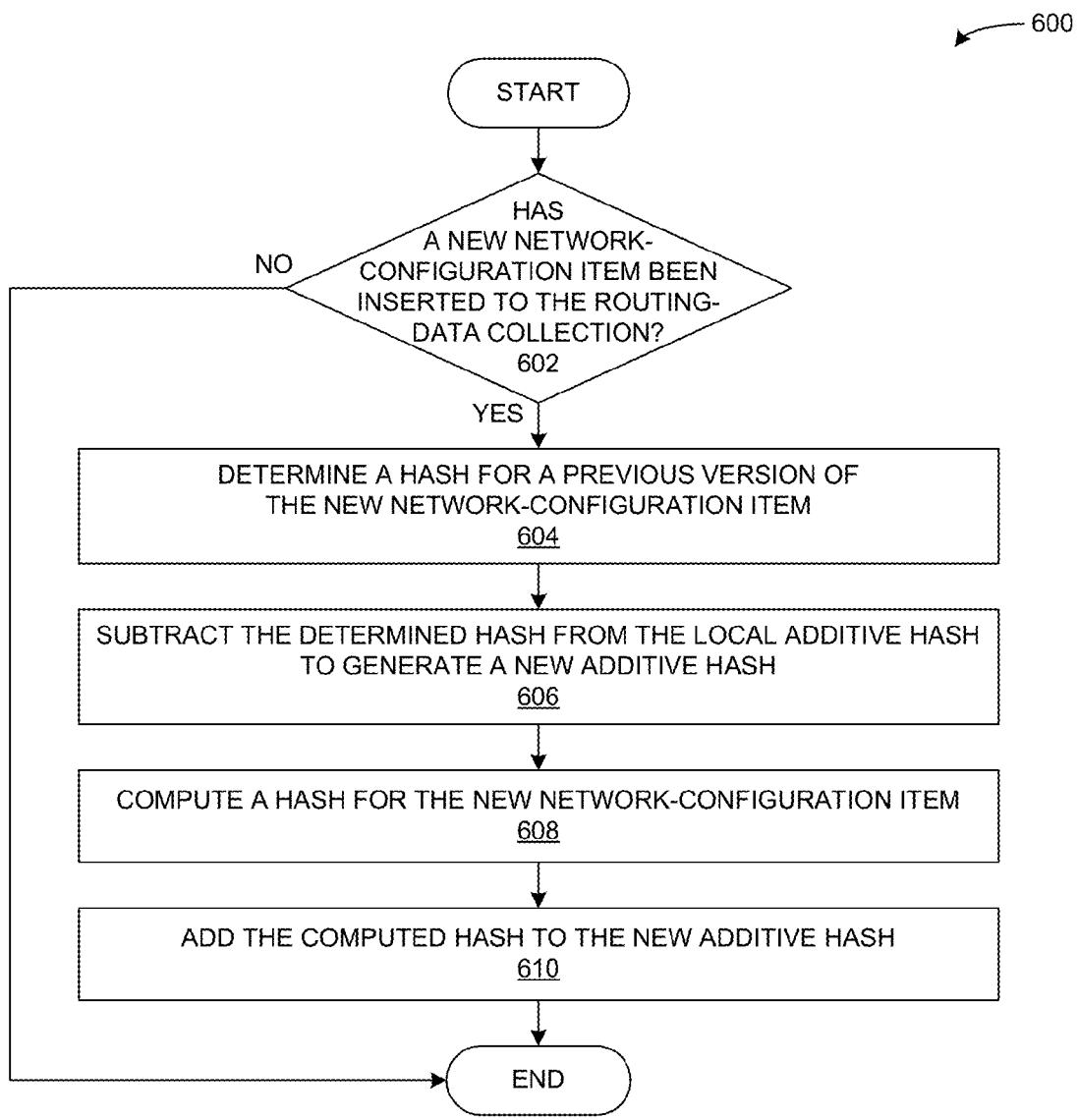
FIG. 6 presents a flow chart illustrating a method for generating a new additive hash for the routing-data collection in accordance with an embodiment.

FIG. 6 presents a flow chart illustrating a method 600 for generating a new additive hash for the routing-data collection in accordance with an embodiment. During operation, the system determines whether a new network-configuration item has been inserted to the routing-data collection to replace a previous version (operation 602). If so, the system determines a hash for a previous version of the new network-configuration item (operation 604), and subtracts the determined hash from the local additive hash to generate a new additive hash (operation 606). The system also computes a hash for the new network-configuration item (operation 608), and adds the computed hash to the new additive hash (operation 610).

Figure 7:
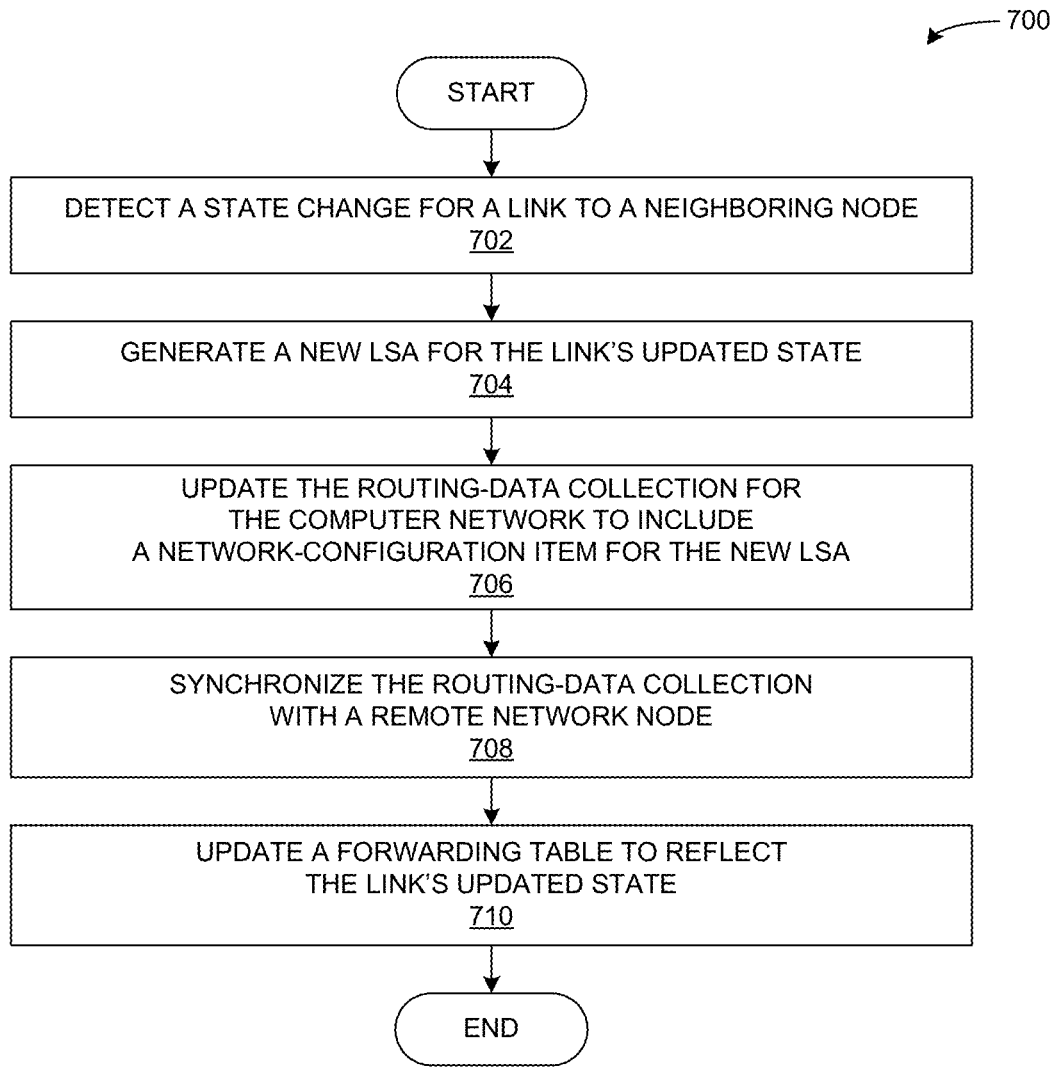
FIG. 7 presents a flow chart illustrating a method for synchronizing a routing-data collection with a remote network node in response to detecting a state change for a link in accordance with an embodiment.

FIG. 7 presents a flow chart illustrating a method 700 for synchronizing a routing-data collection with a remote network node in response to detecting a state change for a link in accordance with an embodiment. During operation, in a link-based routing protocol, the system can detect a state change for a link to a neighboring node of the computer network (operation 702), and generates a new LSA for the link's change in state (operation 704). The system also updates the routing-data collection for the computer network to include a network-configuration item for the new LSA (operation 706), and synchronizes the routing-data collection with a remote network node (operation 708). The system also updates a forwarding table to reflect the link's updated state (operation 710).

In some embodiments, when the system determines during operation 304 that the current version of the remote and local routing-data collections do not match, the system can provide an additive hash to a remote network node so that the remote node can respond with network-configuration items that indicate updated link states. In some embodiments, the local node may not be interested in synchronizing all network-configuration items for all computer networks. The system can provide a filter to the remote node to indicate selection criteria for selecting which link states are to be synchronized with the local device.

Figure 8:
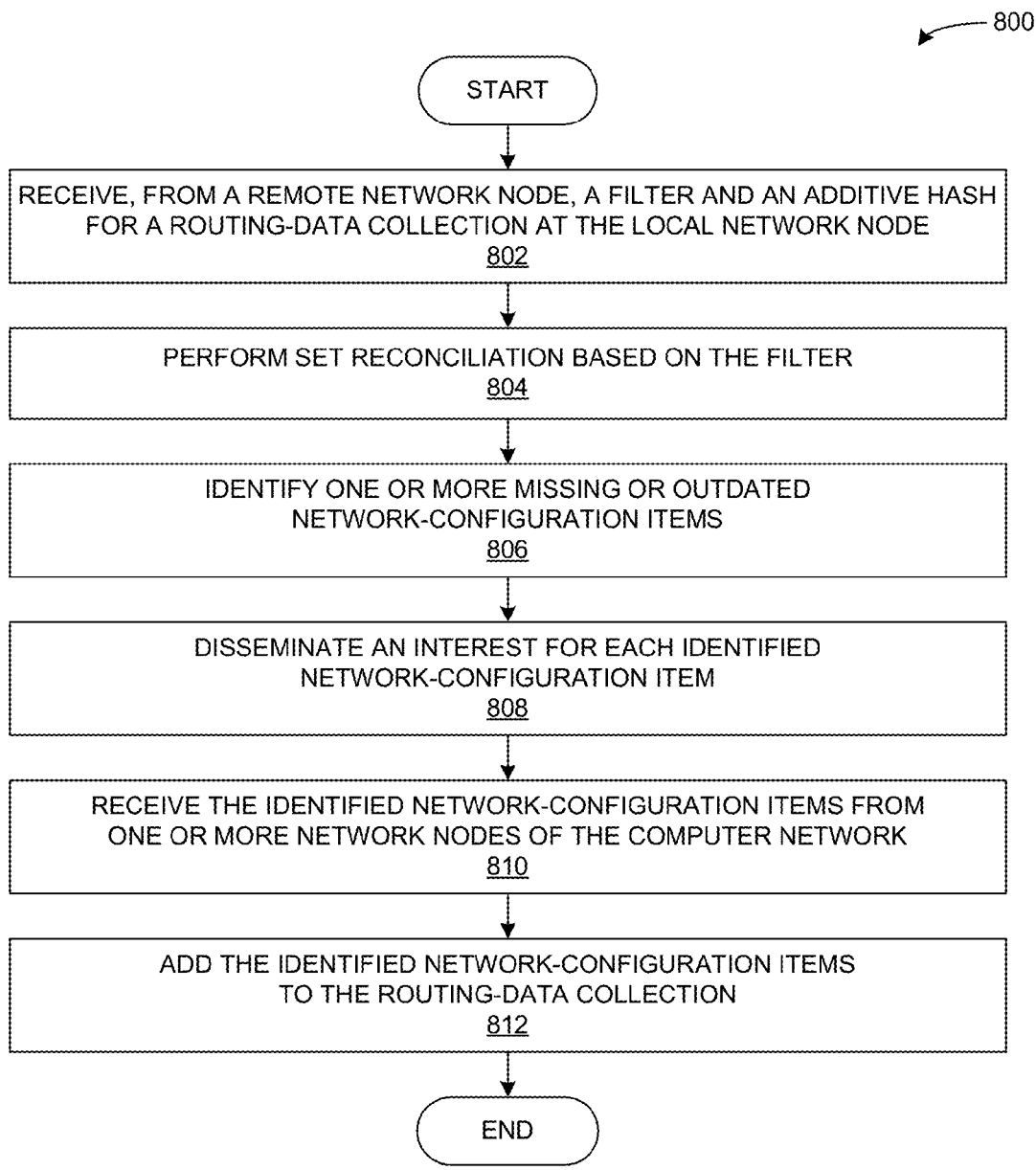
FIG. 8 presents a flow chart illustrating a method for updating a local routing-data collection to include network-configuration items from remote network nodes in accordance with an embodiment.

FIG. 8 presents a flow chart illustrating a method 800 for updating a local routing-data collection to include network-configuration items from remote network nodes in accordance with an embodiment. During operation, the system can receive, from a remote network node, a filter and an additive hash for a routing-data collection at the local network node (operation 802). The system then performs set-reconciliation with the remote network node based on the filter (operation 804), and identifies one or more missing or outdated network-configuration items of the local routing-data collection (operation 806). The system then disseminates an interest for each identified network-configuration item (operation 808). In some embodiments, by disseminating an interest, the system can receive the corresponding network-configuration item from the remote network node, or from any network node that stores the identified network-configuration item (operation 810). The system then proceeds to add the identified network-configuration items to the routing-data collection (operation 812).

Recall that, if a new network-configuration item replaces a previous version of the network-configuration item (e.g., replaces CE table entries for a custodian), the system removes the previous version of the new network-configuration item from the local routing-data collection, and adds the new network-configuration item to the routing-data collection. The system then generates a new additive hash for the routing-data collection that accounts for the changes in the routing-data collection. For example, the additive hash can be a sum of the individual hashes for the network-configuration items of the routing-data collection. Thus, the system can generate the new additive hash by subtracting a hash for the previous network-configuration item from an existing additive hash for the routing-data collection, and adding a hash for the updated network-configuration item to the new additive hash.

Using Filters to Generate Additive Hashes

In some embodiments, the system can generate additive hashes for the local routing-data collection (e.g., an additive hash and/or a filter hash) when it receives a new filter from a remote device, or when it finishes synchronizing the local routing-data collection with the remote device.

Figure 9:
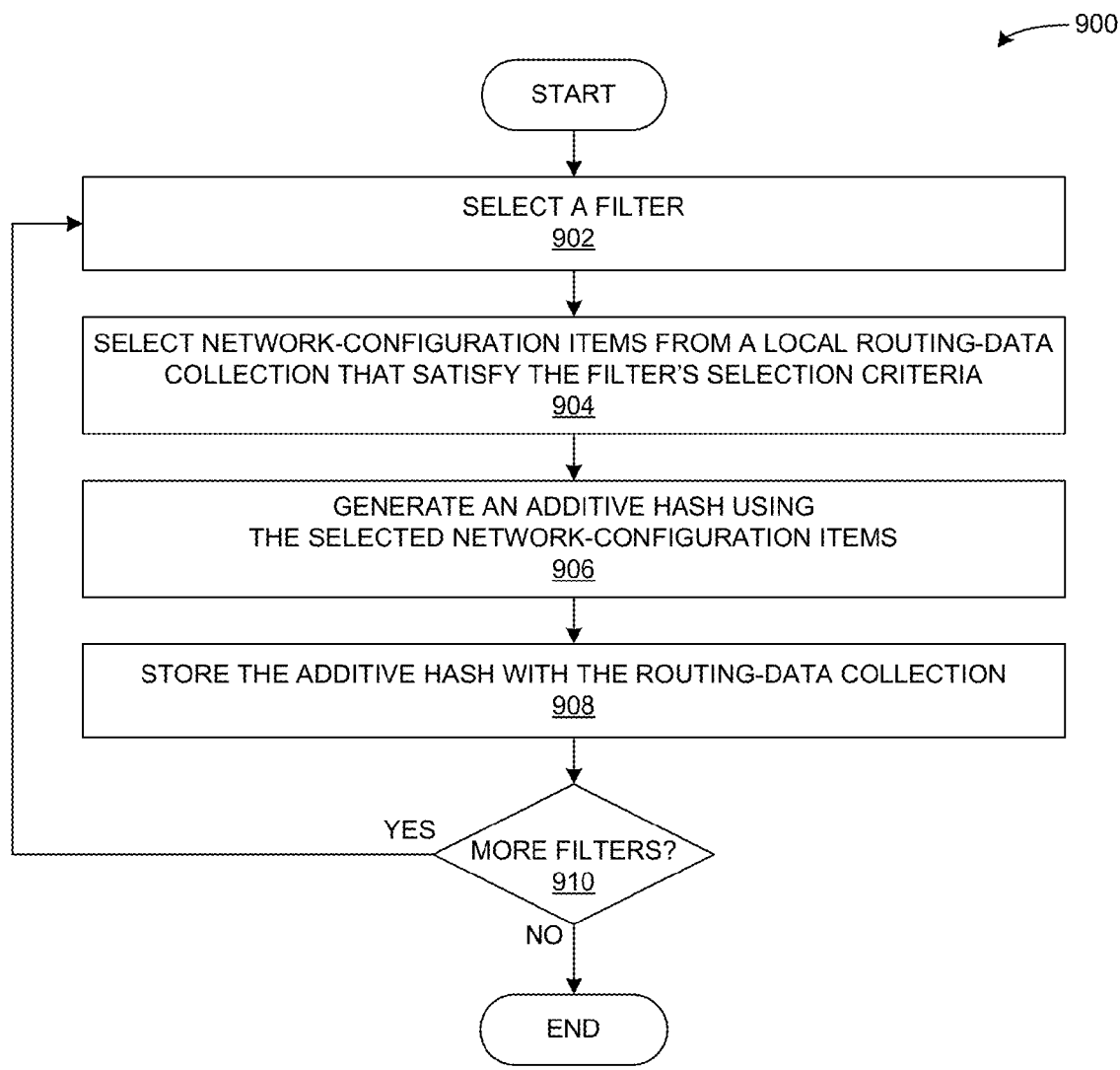
FIG. 9 presents a flow chart illustrating a method for generating additive hashes for an updated routing-data collection in accordance with an embodiment.

FIG. 9 presents a flow chart illustrating a method 900 for generating additive hashes for an updated routing-data collection in accordance with an embodiment. During operation, the system selects a filter (e.g., a filter received from a remote device) (operation 902), and selects network-configuration items from the local routing-data collection that satisfy the filter's selection criteria (operation 904). The system generates an additive hash using the selected network-configuration items (operation 906), and stores the additive hash with the routing-data collection (operation 908).

The system then determines whether it needs to apply any other filters to the current version of the routing-data collection (operation 910). If so, the system returns to operation 902 to select another filter.

Figure 10:
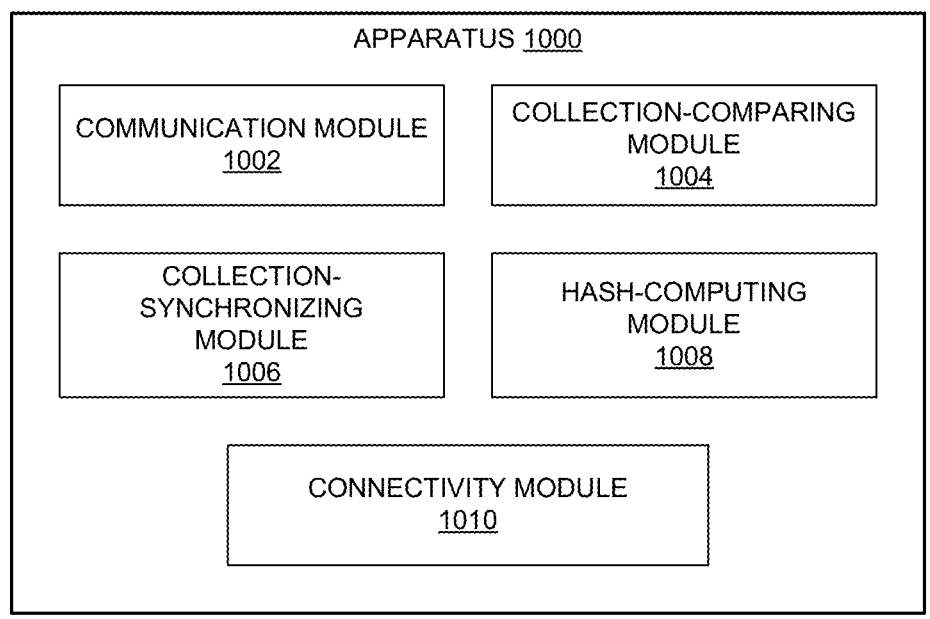
FIG. 10 illustrates an exemplary apparatus that facilitates synchronizing network-configuration information with a remote network node in accordance with an embodiment.

FIG. 10 illustrates an exemplary apparatus 1000 that facilitates synchronizing network-configuration information with a remote network node in accordance with an embodiment. Apparatus 1000 can comprise a plurality of modules which may communicate with one another via a wired or wireless communication channel. Apparatus 1000 may be realized using one or more integrated circuits, and may include fewer or more modules than those shown in FIG. 10. Further, apparatus 1000 may be integrated in a computer system, or realized as a separate device which is capable of communicating with other computer systems and/or devices. Specifically, apparatus 1000 can comprise a communication module 1002, a collection-comparing module 1004, a collection-synchronizing module 1006, a hash-computing module 1008, and a connectivity module 1010.

In some embodiments, communication module 1002 can receive an additive hash for one or more routing-data collections of a remote device, such that the additive hash represents one or more network-configuration items of the routing-data collection. Collection-comparing module 1004 can compare, for a local routing-data collection that also exists at the remote device, a local additive hash for the local routing-data collection with a remote additive hash for the corresponding remote routing-data collection at the remote device.

Collection-synchronizing module 1006 can synchronize network-configuration items for the local and remote routing-data collections. A network-configuration item can include a structured name that indicates a unique and persistent name for the network-configuration item independent of a storage location for the network-configuration item. Hash-computing module 1008 can generate an additive hash for the local routing-data collection by performing an arithmetic function (e.g., an addition operation) on individual hashes for a plurality of network-configuration items of the data collection (e.g., network-configuration items that satisfy a filter's selection criteria).

Connectivity module 1010 can generate a network-configuration item, and adds the network-configuration item to the routing-data collection. Connectivity module 1010 can also configure hash-computing module 1008 to generate a new additive hash for the routing-data collection, and can update a forwarding table for the computer network to account for an updated network-configuration item.

Figure 11:
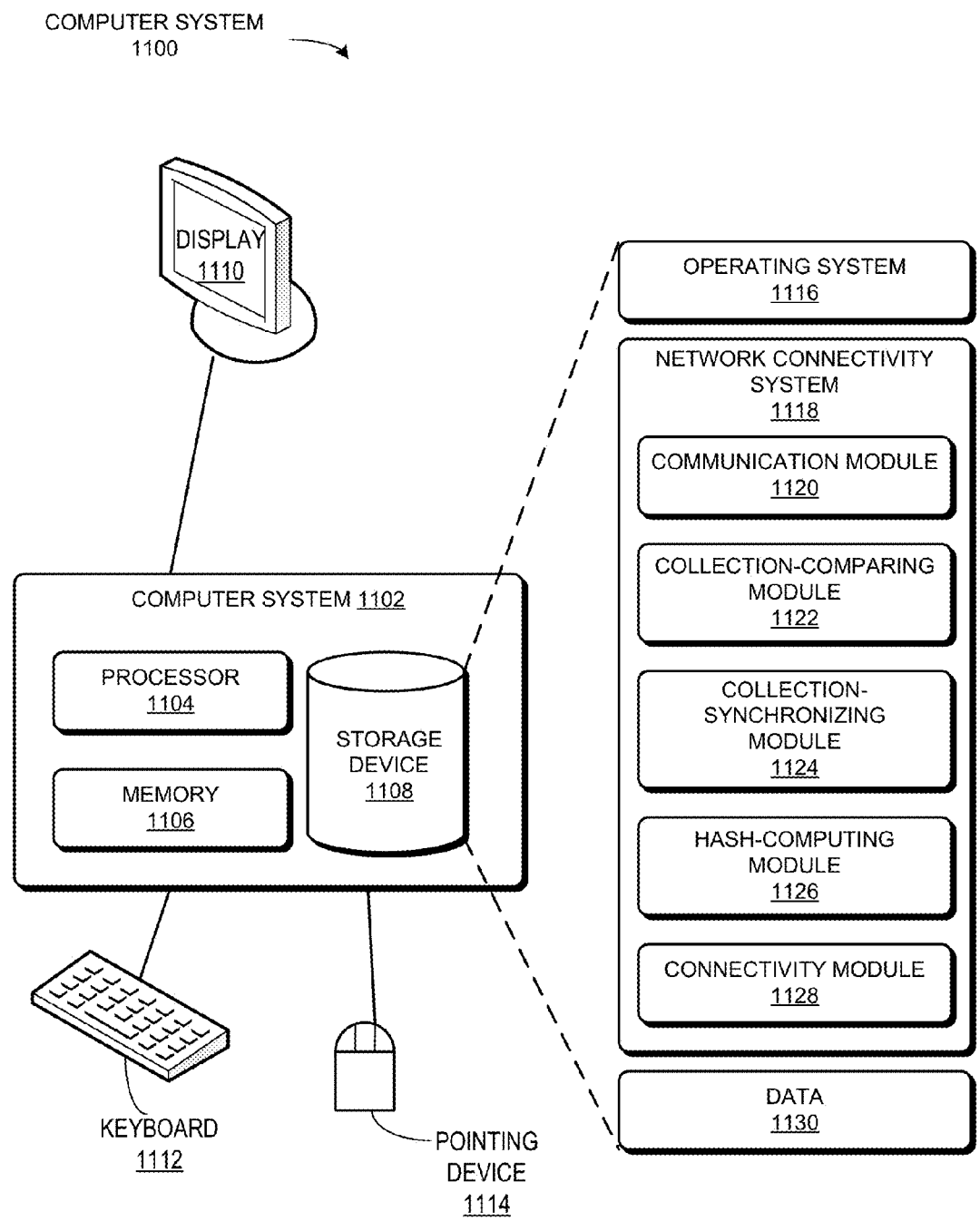
FIG. 11 illustrates an exemplary computer system that facilitates synchronizing network-configuration information with a remote network node in accordance with an embodiment.

FIG. 11 illustrates an exemplary computer system 1102 that facilitates synchronizing network-configuration information with a remote network node in accordance with an embodiment. Computer system 1102 includes a processor 1104, a memory 1106, and a storage device 1108. Memory 1106 can include a volatile memory (e.g., RAM) that serves as a managed memory, and can be used to store one or more memory pools. Furthermore, computer system 1102 can be coupled to a display device 1110, a keyboard 1112, and a pointing device 1114. Storage device 1108 can store operating system 1116, network connectivity system 1118, and data 1130.

Network connectivity system 1118 can include instructions, which when executed by computer system 1102, can cause computer system 1102 to perform methods and/or processes described in this disclosure. Specifically, network connectivity system 1118 may include instructions for receiving an additive hash for one or more routing-data collections of a remote device, such that the additive hash represents one or more network-configuration items of the routing-data collection (communication module 1120). Further, network connectivity system 1118 can include instructions for comparing, for a local routing-data collection that also exists at the remote device, a local additive hash for the local routing-data collection with a remote additive hash for the corresponding remote routing-data collection at the remote device (collection-comparing module 1122).

Network connectivity system 1118 can also include instructions for synchronizing network-configuration items for the local and remote routing-data collections (collection-synchronizing module 1124). A network-configuration item can include a structured name that indicates a unique and persistent name for the network-configuration item independent of a storage location for the network-configuration item. Network connectivity system 1118 can also include instructions for generating an additive hash for the local routing-data collection by performing an arithmetic function (e.g., an addition operation) on individual hashes for a plurality of network-configuration items of the data collection (hash-computing module 1126).

Network connectivity system 1118 can also include instructions for generating a network-configuration item, and adding the network-configuration item to the routing-data collection (connectivity module 1128). Network connectivity system 1118 can also include instructions for configuring hash-computing module 1126 to generate a new additive hash for the routing-data collection, and for updating a forwarding table for the computer network to account for an updated network-configuration item.

Data 1130 can include any data that is required as input or that is generated as output by the methods and/or processes described in this disclosure. Specifically, data 1130 can store at least a routing-data collection that includes one or more network-configuration items (e.g., an LSA, a PC table entry, a CE table entry, etc.), an additive hash for a data collection, one or more additive hashes for the routing-data collection, selection criteria for selecting network-configuration items from a collection, and filters that indicate selection criteria for generating an additive hash for the routing-data collection.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   receiving, by a local network node, a remote additive hash representing one or more network-configuration items of a routing-data collection of a remote network node, wherein at least one of the network-configuration items of the remote additive hash includes reachability information for a network node of a computer network;
   computing a local additive hash representing contents of a local routing-data collection of the local network node, based on hashes for a plurality of individual network configuration items of the local routing-data collection;
   comparing the local additive hash with the remote additive hash;
   responsive to determining that the remote additive hash does not match the local additive hash,
   synchronizing the local routing-data collection with the routing-data collection of the remote network node of the computer network, which involves:
   comparing the remote additive hash to one or more historical additive hashes for the local routing-data collection;
   responsive to determining that the remote additive hash does not match at least one historical additive hash of the local routing-data collection, identifying and obtaining one or more network-configuration items from the routing-data collection of the remote network node that are missing from the local routing-data collection; and
   adding the missing one or more network-configuration items to the local routing-data collection.

2. The method of claim 1, further comprising:
   receiving a filter from the remote network node, wherein the filter indicates selection criteria for selecting network-configuration items that are desired by the remote network node;
   determining, from the local routing-data collection, a set of network-configuration items that satisfy the filter's selection criteria; and
   generating the local additive hash using the network-configuration items that satisfy the filter's selection criteria.

3. The method of claim 2, wherein synchronizing the routing-data collection involves:
   generating a filtered collection of network-configuration items that includes, from the network-configuration items that satisfy the filter's selection criteria, one or more network-configuration items that are missing from the remote routing-data collection; and
   sending structured names for the network-configuration items of the filtered collection to the remote network node.

4. The method of claim 1,
   wherein synchronizing the local routing-data collection further involves:
   comparing the remote additive hash to one or more historical additive hashes of the local routing-data collection to determine a matching historical additive hash; and
   determining, based on the matching historical additive hash, one or more network-configuration items to send to the remote network node.

5. The method of claim 1, further comprising:
   generating a network-configuration item that corresponds to a change in a network configuration of the computer network;
   adding the network-configuration item to the local routing-data collection;
   generating a new additive hash for the routing-data collection; and
   responsive to adding the network-configuration item to the local routing-data collection, synchronizing the local routing-data collection with the remote network node of the computer network.

6. The method of claim 5, wherein the network-configuration item includes a link-state advertisement (LSA) that reflects a change in state for a link of the computer network; and
   wherein the method further comprises updating a forwarding table for the computer network to account for the link's updated state.

7. The method of claim 6, wherein generating the new additive hash involves:
   determining a hash for a previous LSA for the link;
   subtracting the determined hash from the local additive hash for the local routing-data collection;
   computing a hash for the obtained LSA; and
   adding the computed hash to the local additive hash.

8. The method of claim 5, wherein the network-configuration item includes an entry for a Prefix-to-Custodian table (PC table); and
   wherein the method further comprises updating the PC table for the computer network to account for the network-configuration item.

9. The method of claim 5, wherein the network-configuration item includes one or more entries for a Custodian-to-Endpoint table (CE table); and wherein the method further comprises updating the CE table for the computer network to account for the network-configuration item.

10. A non-transitory computer-readable storage medium storing instructions that when executed by a computer cause the computer to perform a method, the method comprising:

receiving a remote additive hash representing one or more network-configuration items of a routing-data collection of a remote network node, wherein the remote additive hash represents one or more network-configuration items of the routing-data collection of the remote network node, and wherein at least one of the network-configuration items of the remote additive hash includes reachability information for a network node of a computer network;

computing a local additive hash representing contents of a local routing-data collection of the local network node, based on hashes for a plurality of individual network configuration items of the local routing-data collection;

comparing the local additive hash with the remote additive hash;

responsive to determining that the remote additive hash does not match the local additive hash, synchronizing the local routing-data collection with the routing-data collection of the remote network node of the computer network, which involves:

comparing the remote additive hash to one or more historical additive hashes for the local routing-data collection;

responsive to determining that the remote additive hash does not match at least one historical additive hash of the local routing-data collection, identifying and obtaining one or more network-configuration items from the routing-data collection of the remote network node that are missing from the local routing-data collection; and adding the missing one or more network-configuration items to the local routing-data collection.

11. The storage medium of claim 10, further comprising:

receiving a filter from the remote network node, wherein the filter indicates selection criteria for selecting network-configuration items that are desired by the remote network node;

determining, from the local routing-data collection, a set of network-configuration items that satisfy the filter's selection criteria; and generating the local additive hash using the network-configuration items that satisfy the filter's selection criteria.

12. The storage medium of claim 11, wherein synchronizing the routing-data collection involves:

generating a filtered collection of network-configuration items that includes, from the network-configuration items that satisfy the filter's selection criteria, one or more network-configuration items that are missing from the remote routing-data collection; and sending structured names for the network-configuration items of the filtered collection to the remote network node.

13. The storage medium of claim 10, wherein synchronizing the local routing-data collection further involves:

comparing the remote additive hash to one or more historical additive hashes of the local routing-data collection to determine a matching historical additive hash; and determining, based on the matching historical additive hash, one or more network-configuration items to send to the remote network node.

14. The storage medium of claim 10, further comprising:

generating a network-configuration item that corresponds to a change in a network configuration of the computer network;

adding the network-configuration item to the local routing-data collection;

generating a new additive hash for the routing-data collection; and responsive to adding the network-configuration item to the local routing-data collection, synchronizing the local routing-data collection with the remote network node of the computer network.

15. The storage medium of claim 10, wherein the network-configuration item includes a data item selected from the group consisting of:

a link-state advertisement (LSA) that reflects a change in state for a link of the computer network;

an entry for a Prefix-to-Custodian table (PC table); and one or more entries for a Custodian-to-Endpoint table (CE table).

16. An apparatus comprising:

a processor;

a memory;

a data storage device storing instructions that when executed implement modules comprising:

a communication module to receive a remote additive hash representing one or more network-configuration items of a routing-data collection of a remote network node, wherein the remote additive hash represents one or more network-configuration items of the routing-data collection of the remote network node, and wherein at least one of the network-configuration items of the remote additive hash includes reachability information for a network node of a computer network;

a computing module to compute a local additive hash representing contents of a local routing-data collection stored in the memory of the local network node, based on hashes for a plurality of individual network configuration items of the local routing-data collection;

a collection-comparing module to compare the local additive hash with the remote additive hash;

a collection-synchronizing module to, in response to the collection-comparing module determining that the remote additive hash does not match the local additive hash, synchronize the local routing-data collection stored in the memory with the remote network node of the computer network, which involves:

comparing the remote additive hash to one or more historical additive hashes for the local routing-data collection;

responsive to determining that the remote additive hash does not match at least one historical additive hash of the local routing-data collection, identifying and obtaining one or more network-configuration items from the routing-data collection of the remote network node that are missing from the local routing-data collection; and adding the missing one or more network-configuration items to the local routing-data collection.

17. The apparatus of claim 16, wherein the communication module is further configured to receive a filter from the remote network node, wherein the filter indicates selection criteria for selecting network-configuration items that are desired by the remote network node;

wherein the collection-synchronizing module is further configured to determine, from the local routing-data collection, a set of network-configuration items that satisfy the filter's selection criteria; and wherein the apparatus further comprises a hash-computing module to generate the local additive hash using the network-configuration items that satisfy the filter's selection criteria.

18. The apparatus of claim 17, wherein the collection-synchronizing module is further configured to generate a filtered collection of network-configuration items that includes, from the network-configuration items that satisfy the filter's selection criteria, one or more network-configuration items that are missing from the remote routing-data collection; and wherein the communication module is further configured to send structured names for the network-configuration items of the filtered collection to the remote network node.

19. The apparatus of claim 16, wherein the collection-synchronizing module is further configured to:

compare the remote additive hash to one or more historical additive hashes of the local routing-data collection to determine a matching historical additive hash; and determine, based on the matching historical additive hash, one or more network-configuration items to send to the remote network node.

20. The apparatus of claim 16, further comprising a connectivity module to:

generate a network-configuration item that corresponds to a change in a network configuration of the computer network;

add the network-configuration item to the local routing-data collection;

configure the hash-computing module to generate a new additive hash for the routing-data collection; and configure the collection-synchronizing module to synchronize the local routing-data collection with the remote network node of the computer network.

21. The apparatus of claim 16, wherein the network-configuration item includes a data item selected from the group consisting of:

a link-state advertisement (LSA) that reflects a change in state for a link of the computer network;

an entry for a Prefix-to-Custodian table (PC table); and one or more entries for a Custodian-to-Endpoint table (CE table).

* * * * *